Oct. 4, 1927. 1,644,339
I. L. KALATZKY
STATIONARY HUB FOR VEHICLES
Filed Dec. 20, 1926
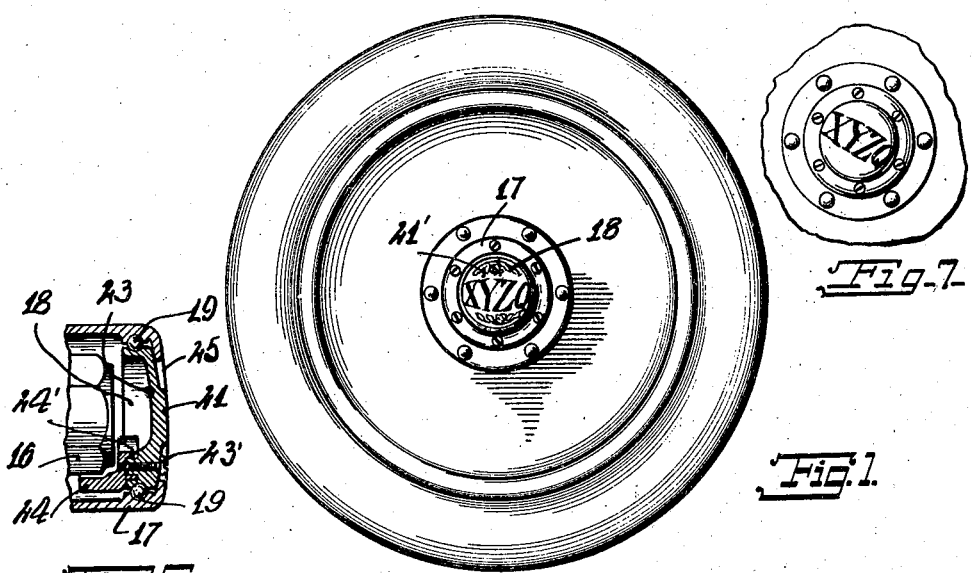
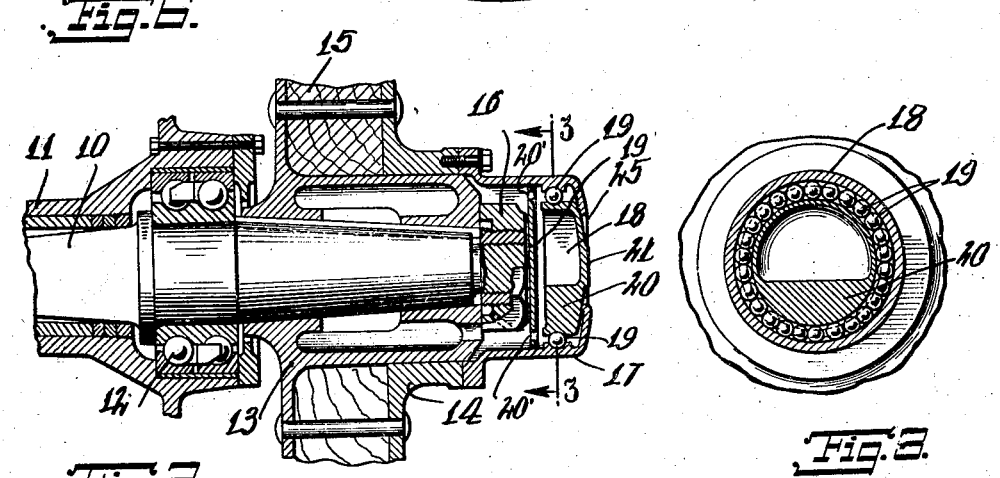
INVENTOR
Irwin L. Kalatzky
BY
ATTORNEY Patented Oct. 4, 1927.

1,644,339

UNITED STATES PATENT OFFICE.

IRWIN L. KALATZKY, OF NEW YORK, N. Y.

STATIONARY HUB FOR VEHICLES.

Application filed December 20, 1926. Serial No. 155,883.

This invenion relates to a new and useful device in the nature of a stationary hub for motor vehicles to provide a means for attaching a name plate, which will remain stationary when the motor vehicle to which same is attached is in motion, which will permit the name or other printed matter thereon to be read when the motor is in motion.

The object of the invention is to provide a stationary hub of novel construction and arrangement of parts, hereinafter more fully described, claimed, and illustrated in the accompanying drawing, in which:—

Fig. 1, shows a front elevational view of my improved device attached to a motor vehicle hub.

Fig. 2, shows an enlarged fragmentary sectional view of a rear wheel hub equipped with my improved device.

Fig. 3, shows a vertical sectional view taken on the line 3—3 of Fig. 2.

Fig. 4, shows a sectional view of a front wheel hub equipped with a modification of my improved device.

Fig. 5 shows a vertical sectional view taken on the line 5—5 of Fig. 4.

Fig. 6 shows a modification of my improved device adapted for a rear hub.

Fig. 7 is an end view of the modification shown in Fig. 6.

The rear axle shaft 10 mounted in the housing 11, rotatively supported on the ball bearing 12, the rear wheel hub 13, attached thereto, in the usual well known manner, the hub flange 14, mounted thereon, and adapted to receive and support the rear wheel 15, the nut 16 adapted to attach the rear wheel hub 13 to the rear axle shaft 10, and the rear wheel hub cap 17, are the general elements of a motor vehicle of common design and construction such as ordinarily used.

The stationary member 18, is mounted on the ball bearing 19 carried in the rear wheel hub cap 17. The stationary member 18 is provided with an enlarged portion 20, so as to provide a counter weight, which will hold the stationary member 18, stationary when the rear wheel of the motor vehicle is in motion or revolving. The name of the motor vehicle is printed, engraved, or otherwise affixed to the stationary member 18, as at 21. The rear wheel hub cap 17 is provided with an opening 22, so as to permit the name of the motor vehicle affixed to the stationary member 18 to be visible.

The plate member 19′ is adapted to engage in the rear wheel hub cap 17 intermediate the nut 16 and the stationary member 18. The plate member 19′ is provided with apertures 20′, positioned at or near the periphery of the plate member 19′, as a means of permitting the lubricant placed in the hub cap 17′, adjacent to the nut 16, to pass through the apertures 20′, so as to lubricate the ball bearing 19.

Referring in particular to Fig. 6 it will be seen that the stationary member 23, is of disc construction. The inwardly extended member 24, is provided with a circumferential groove 24′, adapted to engage in a similar shaped tongue element of the stationary member 23. The inwardly extended member 24 is attached to the stationary member 23, by the threaded member 23′, a machine screw, or the like, which is adapted to engage in threaded apertures formed in the inwardly extended member 24. The above described construction is such as will permit the inwardly extended member 24 to be attached to the stationary member 23, so as to position or hold the name 21 of the motor vehicle, to which same is attached in a horizontal or slightly angular position as shown in Fig. 7. The latter mentioned angular position is such as will permit the said name to be more readily visible when the motor vehicle is approaching.

Referring in particular to Fig. 6 the stationary member 23 is of disc construction, and is provided with an inwardly extended portion 24, which will act as a counter weight for the purpose as hereinbefore set forth.

Referring in particular to Fig. 4 it will be seen that the front axle 30, the front axle hub 31, pivotally mounted on the king pin 32, mounted in the front axle 30, the front wheel 33 rotatively mounted on the bearings 34 and 35, carried on the front axle hub 31, and held in position thereon by the nut 36 threadedly attached to the front axle hub 31, and the front wheel hub cap 39, attached to the front wheel 33, are the general elements of a motor vehicle of common design and construction such as ordinarily used.

The stationary member 37 is provided with a recessed portion 38 adapted to engage the above mentioned nut 36. The name of the motor vehicle is printed, engraved, or otherwise affixed to the stationary member 37. It is understood that the nut 36 is stationary. The front wheel hub cap 39 is provided with an opening 40, so as to permit the name of the motor vehicle affixed to the stationary member 37 to be visible.

Having thus described my invention, what I claim as new and desire to protect by Letters Patent of the United States is as follows:

1. In combination with a device of the class described, a plate member adapted to engage in the rear wheel hub cap of a motor vehicle, said plate member positioned intermediate a nut adapted to attach a rear wheel hub of a motor vehicle to the rear axle shaft of the said motor vehicle, and a stationary member mounted in the said rear wheel hub cap, said plate member provided with apertures.

2. In a device of the class described a hub cap having an opening in the end thereof, a flange on the inner surface of said hub cap having a groove therein, a plurality of ball bearings disposed in said groove, a substantially cylindrical member comprising a closed end rotatively mounted on said ball bearings within said hub cap having a peripheral groove therein adapted to register with the groove of said flange, the closed end of said cylindrical member being provided with letters visible through the opening in the end of said hub cap, and a weight in said cylindrical member adapted to retain the same substantially stationary while said hub cap rotates.

3. In a device of the class described a hub cap having an opening in the end thereof, a flange on the inner surface of said hub cap having a groove therein, a plurality of ball bearings disposed in said groove, a substantially cylindrical member comprising a closed end rotatively mounted on said ball bearings within said hub cap having a peripheral groove therein adapted to register with the groove of said flange, the closed end of said cylindrical member being provided with letters visible through the opening in the end of said hub cap, and an adjustable weight on said cylindrical member adapted to be suitably positioned thereon for retaining the letters on the end of the said hub cap at a predetermined inclination to a horizontal position while retaining said cylindrical member substantially stationary during rotation of said hub cap.

4. In a device of the class described a hub cap having an opening in the end thereof, said hub cap having a groove on the inner surface thereof, a plurality of ball bearings disposed in said groove, a substantially cylindrical member having a closed end and being rotatively mounted on said ball bearings within said hub cap and having a peripheral groove therein adapted to register with the groove of said hub cap, the closed end of said cylindrical member being provided with letters visible through the opening in the end of said hub cap, and a weight in said cylindrical member adapted to retain the same substantially stationary while said hub cap rotates.

5. In a device of the class described a hub cap having an opening in the end thereof, a flange on the inner surface of said hub cap having a groove therein, a plurality of ball bearings disposed in said groove, a substantially cylindrical member having a closed end and being rotatively mounted on said ball bearings within said hub cap and having a peripheral groove therein adapted to register with the groove of said flange, the closed end of said cylindrical member being provided with letters visible through the opening in the end of said hub cap, and means in said cylindrical member adapted to retain the same substantially stationary while said hub cap rotates.

In testimony whereof I have affixed my signature.

IRWIN L. KALATZKY.